United States Patent [19]

Buxbaum

[11] B 3,996,201

[45] Dec. 7, 1976

[54] LINEAR, THERMOPLASTIC POLYESTERS AND PROCESS FOR THEIR MANUFACTURE

[75] Inventor: Lothar Buxbaum, Lindenfels, Germany

[73] Assignee: Ciba-Geigy Corporation, Ardsley, N.Y.

[22] Filed: Nov. 5, 1974

[21] Appl. No.: 521,127

[44] Published under the second Trial Voluntary Protest Program on February 17, 1976 as document No. B 521,127.

[30] Foreign Application Priority Data

Nov. 13, 1973 Switzerland .................... 15955/73

[52] U.S. Cl. ............................ 260/75 N; 260/75 S; 260/75 H; 260/DIG. 24
[51] Int. Cl.² ........................................ C08G 63/68
[58] Field of Search ........ 260/75 N, 75 H, DIG. 24

[56] References Cited

UNITED STATES PATENTS

| 2,925,405 | 2/1960 | Laakso et al. ................... 260/75 N |
| 3,217,014 | 11/1965 | Van Strien et al. .............. 260/75 N |
| 3,856,754 | 12/1974 | Habermeier et al. ............ 260/75 N |
| 3,860,564 | 1/1975 | Habermeier et al. ............ 260/75 N |

FOREIGN PATENTS OR APPLICATIONS

| 2,065,002 | 12/1971 | Germany |
| 2,218,229 | 11/1972 | Germany |

*Primary Examiner*—Howard E. Schain
*Assistant Examiner*—W. C. Danison, Jr.
*Attorney, Agent, or Firm*—Luther A. R. Hall

[57] ABSTRACT

Linear, homo- and copolymers that contain as condensation components amidocarboxylic acid radicals, imidocarboxylic acid radicals or dicarboxylic acid radicals containing two carbocyclic rings with 4 to 6 members and diol radicals containing N,N-heterocyclic rings, and which can contain in addition terephthalic and/or isophthalic acid and/or other diols, are amorphous to faintly crystalline, have high glass transition temperatures while at the same time having low softening temperatures, and are suitable for the manufacture of mouldings of all kinds with good thermomechanical properties.

24 Claims, 1 Drawing Figure

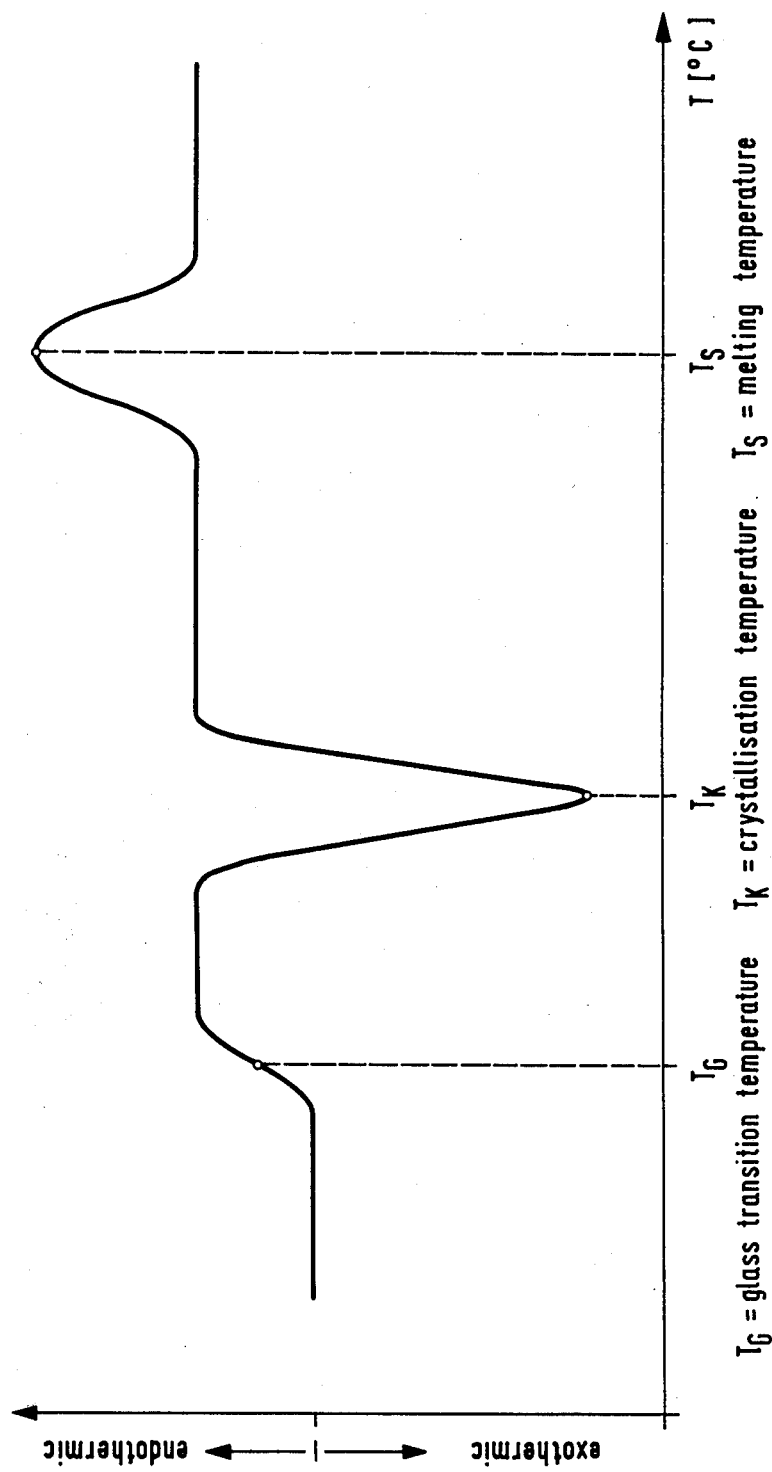

LINEAR, THERMOPLASTIC POLYESTERS AND PROCESS FOR THEIR MANUFACTURE

The present invention provides linear, thermoplastic polyesters of amidodicarboxylic acids, imidodicarboxylic acids or dicarboxylic acids that contain two 4- to 6-membered carbocyclic groups and diols that contain N,N-heterocyclic rings, which optionally contain terephthalic acid, isophthalic acid and/or aliphatic cycoaliphatic diols as co-components, a process for the manufacture of the new polyesters and a method of using them as useful thermoplastic moulding compounds.

Thermoplastic polyesters derived from terephthalic acid, isophthalic acid and aliphatic diols, e.g. polyethylene terephthalate and polybutylene terephthalate, and their use for manufacturing mouldings with good mechanical properties are known. The articles manufactured from there polyesters, however, also possess disadvantages, particularly in their thermomechanical properties. As a rule, the glass transition point of these polyesters is relatively low, which is a handicap in many industrial uses, since amorphous mouldings made from them lose their stiffness at relatively low temperatures. It is a further disadvantage of the known polyalkyleneterephthalates that it is necessary to apply fairly high temperatures for their processing because of the high crystalline melting points and that only with difficulty can amorphous mouldings be obtained from the moulding compounds. The poor stiffness of the amorphous mouldings made from these polyesters is due to the fact that amorphous polyesters begin to soften in the range of the glass transition temperature.

It is known to raise the setting temperatures of the polyalkylene terephthalates by co-condensing them with dicarboxylic acids and/or diols with reinforcing action or by replacing the alkylene diol and/or e.g. terephthalic acid completely by these components. A number of such amorphous polyesters with increased setting temperatures are described in "Angewandte Makromoleculare Chemie" 33, 1973, pp. 111–127.

As componnts there are mentioned, for example, 4,4'-diphenyldicarboxylic acid, diphenylsulphone-4,4'-dicarboxylic acid or 1,1,3-trimethyl-5-carboxyl-3-(p-carboxyphenyl)-indane, and as diols 1,4-dihydroxymethylcyclohexane, 2,2,4,4-tetramethyl-1,3-cyclobutane diol or dispiro-(5.1.5.1)-tetradecane-7,14-diol. Some of these starting components are expensive and further, polyesters that are synthesised only from one of these diols and dicarboxylic acid normally have high melt temperatures that are frequently above 300°C. In DOS 1,935,252, the proposal is made to lower the high melting temperature of polyesters from diphenyldicarboxylic acid and 1,4-dihydroxymethylcyclohexane by addition of terephthalic acid and aliphatic diols; and DOS 2,140,615 describes polyesters with lowered melting ranges from diphenylsulphone-4,4'-dicarboxylic acid and ethylene glycol/neopentyl glycol mixtures. The drawback of these proposals is that, on repeatedly carrying out known methods of manufacture, polyesters with unchanges properties are obtained only with difficulty, since the diols have different volatilities. Amorphous polyesters modified with terephthalic acid and with setting temperatures above 100°C obtained from diphenylsulphone-4,4'-dicarboxylic acid and 1,4-hydroxymethylcyclohexane are described in DOS 2,146,055.

The manufacture of linear polyesters with high glass transition temperatures from terephthalic acid, 1,4-hydroxymethylcyclohexane and a dicarboxylic acid which contains two 4- to 6-membered carbocyclic rings is taught in U.S. Pat. No. 3,547,888. U.S. Pat. No. 3,217,014 describes polyesters that contain N-(carboxyphenyl)-trimellitic acid imides. However, these polyesters have melt temperatures of over 300°C. The difficulties in processing these polyesters are so great that they have attained no importance. It was therefore the object of the present invention to synthesise linear polyesters with high glass transition temperatures and lower softening ranges, in particular amorphous, linear polyesters.

It has now been found that polyesters with these properties are obtained by polycondensing cheaply produceable bis-(hydroxyalkyl)compounds containing 2 to 6 N,N-heterocyclic rings and aromatic dicarboxylic acids containing 1 or 2 carboxy amide groups or an imide group that is condensed to an aromatic radical or containing at least 2 carbocyclic rings, optionally together with terephthalic and/or isophthalic acid and/or aliphatic diols, 1,4-hydroxymethylcyclohexane and/or 1,4-hydroxycyclohexane. It is surprising and unexpected in particular that the glass transition temperatures can be further raised by the heterocyclic diol component and consequently not only by dicarboxylic acids this acition of which was already known. It is also surprising that the modification with the heterocyclic diol causes the melt and glass transition temperatures to fall to values that are generally below 250°C and partly below 200°C.

A further surprising advantage is to be observed in the fact that the polyesters according to the invention are to be modified over a wide range with respect to their glass transition temperatures, melting points and crystallisation behaviour in such a way that the mouldings manufactured therefrom can be used in a wide field of application and that adjustments for utilities of the most widely varying kind are possible. Yet another advantage resides in the fact that the polyesters according to the invention are amorphous or so faintly crystalline that they remain transparent when moulded.

Compared with the polyalkylene terephthalates, the polyesters according to the invention re characterised by higher glass transition temperatures while at the same time having lower melt and softening temperatures, and compared with known polyesters with high glass transition temperatures, by lower melt and softening temperatures. They also possess improved thermomechanical properties while at the same time affording improved processing possibilities.

The invention therefore provides novel linear, thermoplastic polyesters with high glass transition temperatures and a relative viscosity of 1.1 to 4.0, measured at 30°C in a 1% solution of equal parts of phenol and tetrachloroethane, which are synthesised from, relative to 1 mole of the dicarboxylic acids and 1 mole of the diols, A. 0 to 90 molar %, preferably 5 to 90 molar %, of terephthalic acid and/or isphthalic acid radicals,
B. 10 to 100 molar % of dicarboxylic acid radicals that contain one or two —CO—NH groups and at least one aromatic radical, one or two imide groups condensed to an aromatic radical or contain at least two carbocyclic rings with 4 to 6 members,
C. 5 to 100 molar % of a diol containing 2 to 6, preferably 2 to 4, hydantoin rings up to 3 of which can be replaced by benzimidazolone rings, also by benzhydrogenated benzimidazolone rings, or of a diol that contains a benzohydrogenated benzimidazolone ring or a benzimidazolone ring and/or of a diol that is completely chlorinated and/or brominated at the phenyl nucleus and contains a benzimidazolone rings, and D. 0 to 95 molar %, preferably 5 to 95 molar %, of radicals of an aliphatic diol with 2 to 10 carbon atoms, of 1,4-hydroxymethylcyclohexane and/or of 1,4-hydroxycyclohexane.

The aromatic radicals of component B are preferably aryl radicals, especially phenyl or naphthyl radicals.

Desirably, the polyesters have a relative viscosity of 1.3 to 2.5 and the amount of component C and D is 10 to 100 or 0 to 90 molar %. Preferably, the polyesters contain amidodicarboxylic acid radicals of the formula I

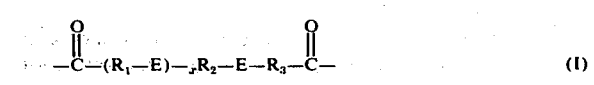

wherein $x$ is 0 or 1, E represents the —CO—NH group the NH group of which can be bonded to $R_2$ or $R_3$ and optionally to $R_1$ or $R_2$, and each of $R_1$, $R_2$ and $R_3$ independently represents an alkylene radical with 1 to 12 carbon atoms, an aromatic, a cycloaliphatic, an aromatic-aliphatic or a cycloaliphatic-aliphatic radical, with the proviso that, if $x$ is 1, $R_2$ cannot be the methylene group when the NH groups of the —CO—NH groups are bonded to $R_2$. Most preferably, the aromatic-aliphatic and/or cycloaliphatic-aliphatic radicals contain one or two methylene and/or ethylene radicals and $R_1$ and $R_2$ are the same. Preferably, at most two of $R_1, R_2$ and $R_3$ are a linear alkylene radical with 1 to 12 carbon atoms and, in particular, the methylene or ethylene radical.

As imidocarboxylic acid radicals, the polyesters contain radicals of N-carboxyalkylated, carboxyphenylalkylated, carboxyalkylphenylalkylated or carboxyphenylated trimellitic or pyromellitic acid imides, the alkylene groups containing most preferably 1 and/or 2 carbon atoms.

Preferred dicarboxylic radicals containing two rings with 4 to 6 members are naphthalenedicarboxylic acid radicals, radicals of carboxyphenylated indanecarboxylic acids or radicals of the formula II

wherein $n$ is 0 or 1, X represents a sulphur atoms, an oxygen atom, the sulphone, methylene, ethylidene or propylidene radical, and each of $R_4$ and $R_5$ independently represents a carbocyclic ring with 4 to 6 members. Preferably $R_4$ and $R_5$ represent a 6-membered ring. Most preferably, X represents the sulphone radical or $n$ is 0 and $R_4$ and $R_5$ represent a phenylene radical.

Preferred N,N-heterocyclic diol radicals are those of the general formula III

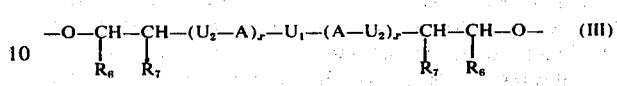

wherein $x$ is 0 or 1, $R_6$ represents a hydrogen atom, the methyl, ethyl or phenyl group and $R_7$ represents a hydrogen atom or together with $R_6$ represents the tetramethylene radical, A represents a radical of the formulae

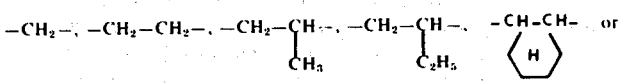

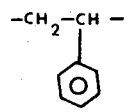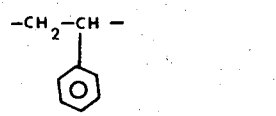

$U_1$ represents a radical of the formulae

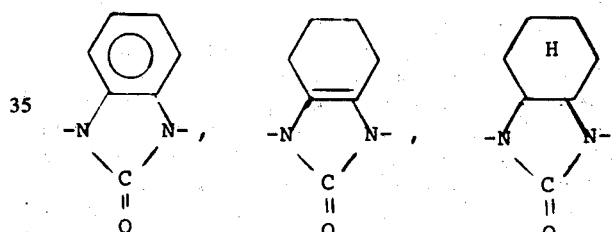

or

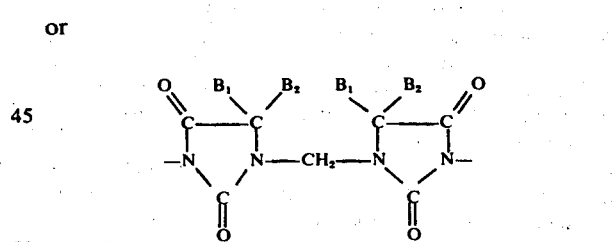

wherein each of $B_1$ and $B_2$ independently represents a hydrogen atom or an alkyl radical with 1 to 4 carbon atoms and $U_2$ has the same meaning as $U_1$ or represents the radical of the formula

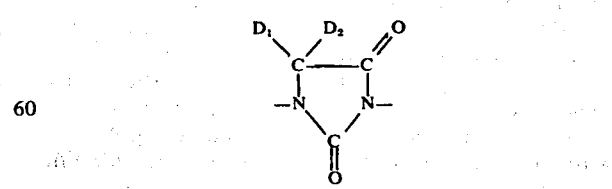

wherein each of $D_1$ and $D_2$ independently represents a hydrogen atom, an alkyl radical with 1 to 4 carbon atoms, the phenyl group or together they represent the pentamethylene radical.

In formula III, most preferably $R_6$ represents a hydrogen atom, A represents the methylene or the ethylene radical and $B_1$ and $B_2$ represent a hydrogen atom, the methyl or ethyl group and $D_1$ and $D_2$ represent a hydrogen atom, the methyl or ethyl group or together represent the pentamethylene radical, and preferably $x$ is 0 and $U_1$ represents the benzimidazolone radical.

The polyesters preferably contain those aliphatic diol radicals with 1 to 6, preferably 1 to 4, carbon atoms and/or 1,4-hydroxymethylcyclohexane radicals.

The new polyesters are obtained by known processes by polycondensing, relative to one mole of the dicarboxylic acids and 1 mole of the diols, A. 0 to 90 molar % of terephthalic acid and/or isophthalic acid or polyester forming derivatives thereof,
B. 10 to 100 molar % of a dicarboxylic acid that contains one or two —CO—NH groups and at least one aromatic radical of a dicarboxylic acid that contains one or two imide groups condensed to an aromatic radical, or of a dicarboxylic acid that contains at least two carbocyclic rings with 4 to 6 members, or polyester forming derivatives thereof.
C. 5 to 100 molar % of a diol that contains 2 to 6, preferably 2 to 4, hydantoin rings up to 3 of which can be replaced by benzimidazolone rings, also by benzhydrogenated benzimidazolone rings, of a diol that contains a benzhydrogenated benzimidazolone ring or a benzimidazolone ring and/or of a diol that is completely chlorinated and/or brominated at the phenyl nucleus and contains a benzimidazolone ring, and
D. 0 to 95 molar % of an aliphatic diol with 2 to 10 carbon atoms, 1,4-hydroxymethylcyclohexane and/or 1,4-hydroxycyclohexane, in the presence of catalysts in known manner to a relative viscosity of 1.1 to 4.0 measured at 30°C in a 1% solution of equal parts of phenol and tetrachloroethane.

The known processes for the manufacture of the novel polyesters are e.g. solvent or azeotropic condensation, interfacial condensation, melt condensation or solid phase condensation, as well as combinations of these methods, depending on which polyester forming derivatives and reaction catalysts are used.

Principally the low molecular dialkyl esters with 1 to 4 carbon atoms in the molecule, preferably dimethyl or diphenyl esters, are used as polyester forming derivatives of the dicarboxylic acids. The acid dihalides, in particular the acid dichlorides, of terephthalic or isophthalic acid and mixed anhydrides of these acids and low molecular aliphatic monocarboxylic acids are also suitable.

The dicarboxylic acid amide compounds of the formula IV

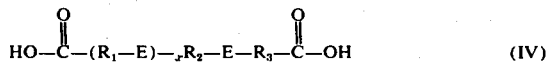

$$HO-\overset{O}{\underset{\|}{C}}-(R_1-E)-_xR_2-E-R_3-\overset{O}{\underset{\|}{C}}-OH \qquad (IV)$$

wherein $x$, E, $R_1$, $R_2$ and $R_3$ have the same meanings as in respect of formula I, are known compounds and can be obtained, for example, by the processes described in DOS 2,150,808 and in U.S. Pat. No. 2,925,405 by reaction of diamines or aminocarboxylic acids with dicarboxylic acids or their derivatives that form the carboxy amide group.

As derivatives that form carboxy amide groups there are used the same derivatives as are used for the manufacture of polyesters. If, for example, alkyl esters of the dicarboxylic acids and diamines or aminocarboxylic acids are used as starting materials in the manufacture of the dicarboxylic acid amide compounds, it is advantageous to use a 1- to 5-fold molar surplus of the dicarboxylic acid esters. If, for example, dicarboxylic acid monomethyl ester monochloride, dicarboxylic acid dichlorides or dicarboxylic acid monochlorides are used as starting material, then preferably the reaction is carried out with 1 mole of an aminocarboxylic acid or a low molecular alkyl ester thereof or with 2 moles of a diamine.

The manufacture of the dicarboxylic acids indicated by the formula IV is illustrated by the following reaction equations. $R_1$, $R_2$ and $R_3$ have here the same meanings as in respect of the formula IV and Y represents OH or a group that forms carboxy amide, e.g. a chloride atom or the methoxy radical.

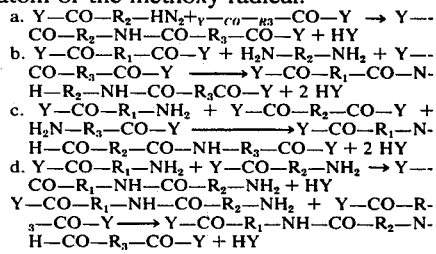

a. Y—CO—R$_2$—HN$_2$+Y—CO—R$_3$—CO—Y → Y—CO—R$_2$—NH—CO—R$_3$—CO—Y + HY
b. Y—CO—R$_1$—CO—Y + H$_2$N—R$_2$—NH$_2$ + Y—CO—R$_3$—CO—Y ⟶ Y—CO—R$_1$—CO—NH—R$_2$—NH—CO—R$_3$CO—Y + 2 HY
c. Y—CO—R$_1$—NH$_2$ + Y—CO—R$_2$—CO—Y + H$_2$N—R$_3$—CO—Y ⟶ Y—CO—R$_1$—NH—CO—R$_2$—CO—NH—R$_3$—CO—Y + 2 HY
d. Y—CO—R$_1$—NH$_2$ + Y—CO—R$_2$—NH$_2$ → Y—CO—R$_1$—NH—CO—R$_2$—NH$_2$ + HY
Y—CO—R$_1$—NH—CO—R$_2$—NH$_2$ + Y—CO—R$_3$—CO—Y ⟶ Y—CO—R$_1$—NH—CO—R$_2$—NH—CO—R$_3$—CO—Y + HY

The above reaction equations indicate the principal possibilities of manufacturing the compounds of the formula IV. If, for example, in an amidocarboxylic acid which has been manufactured according to equation (a) the NH group is bonded to $R_3$, then a start is made from an aminocarboxylic acid and a dicarboxylic acid that contain the radical $R_3$ or $R_2$. The same applies by analogy to equation (d). According to equations (a) and (c), aminocarboxylic acid methyl esters are preferably reacted with dicarboxylic acid chlorides and according to equation (c), dicarboxylic acid monomethyl ester monochloride is reacted with diamines. In the stepwise synthesis according to equation (d), an aminocarboxylic acid ester is preferably reacted initially with an aminocarboxylic acid chloride and then condensed with a dicarboxylic acid monomethyl ester monochloride.

Examples of suitable aminocarboxylic acids for the manufacture of the amidodicarboxylic acids of the formula IV are:
aminoacetic acid
α-aminopropionic acid
β-aminopropionic acid
m- and p-aminocyclohexylacetic acid
m- and p-aminocyclohexanecarboxylic acid
m- and p-aminomethylcyclohexanecarboxylic acid
m- and p-aminoethylcyclohexanecarboxylic acid
1-amino-cyclopentane-3-carboxylic acid.

Examples of suitable aromatic aminocarboxylic acids are:
m- and p-aminobenzoic acid
m- and p-aminomethylbenzoic acid
m- and p-aminoethylbenzoic acid
m- and p-aminophenylacetic acid
m- and p-aminomethylphenylacetic acid
m- and p-aminoethylphenylacetic acid
m- and p-aminophenylpropionic acid
m- and p-aminomethylphenylpropionic acid
2-naphthylamine-6-carboxylic acid
2-naphthylamine-7-carboxylic acid.

Examples of aromatic diamines are:
m- and p-phenylenediamine m- and p-toluylene diamine
m- and p-xylene diamine
m- and p-aminoethylphenylene amine
3,3'-diaminobiphenyl
4,4'-diaminobiphenyl
4,4'-di-(aminodiphenyl)-methane
4,4'-di-(aminophenyl)-sulphone
4,4'-bis-aminomethylbiphenyl
4,4'-bis-aminomethylbiphenyl
p-[4,4'-(bis-aminoethylbiphenyl)]-methane A suitable aliphatic diamine is ethylene diamine and the following cycloaliphatic diamines are particularly suitable:
3-aminomethyl-3,5,5-trimethylcyclohexylamine ("isophoron diamine")
bis-(4-amino-3-methylcyclohexyl)-methane
Bis-(4-amino-3-methylcyclohexyl)cyclohexyl-methane
2,2-bis-(4-aminocyclohexyl)-propane
bis-(4-aminocyclohexyl)-methane
1,8-diamino-p-methane
1-aminomethyl-3-cyclopentylamine
1,3-cyclohexylene diamine
1,4-cyclohexylene diamine
1,4-aminomethylcyclohexylene diamine
2-methyl-1,3-cyclohexylene diamine
2-methyl-1,4-cyclohexylene diamine
1,3-cyclopentylene diamine
1,3-cycloheptylene diamine
1,4-cycloheptylene diamine.

Examples of suitable dicarboxylic acids are:
malonic acid
succinic acid
1,3-cyclobutanedicarboxylic acid
1,3-cyclopentanedicarboxylic acid
2,2-dimethyl-cyclopentanedicarboxylic acid
1-carboxymethyl-3-cyclopentanecarboxylic acid
1,3-bis-carboxymethyl-cyclopentylene
m- and p-cyclohexane dicarboxylic acid
m- and p-carboxymethyl-cyclohexylene
m- and p-carboxyethyl-cyclohexylene
1,3-cycloheptanedicarboxylic acid
1,4-cycloheptanedicarboxylic acid
terephthalic acid
isophthalic acid
1,3-naphthalenedicarboxylic acid
1,4-naphthalenedicarboxylic acid
2,6-naphthalenedicarboxylic acid
2,7-naphthalenedicarboxylic acid
4,4'-diphenyldicarboxylic acid
3,4'-diphenyldicarboxylic acid
4,4'-sulphone-diphenyldicarboxylic acid
1,1,3-trimethyl-5-carboxy-3-(p-carboxyphenyl)-indane.

It is also possible to use with advantage the dicarboxylic acids that contain two carbocyclic rings with 4 to 6 members, or their derivatives, as starting components for the manufacture of the amidocarboxylic acids to be used according to the invention, since by doing so the increase in the glass transition temperature effected by these dicarboxylic acids can be combined with the same action of the amidodicarboxylic acids. The alicyclic compounds mentioned hereinbefore can be in cis- and/or trans-form.

The aromatic dicarboxylic acids that contain imido groups are in part known compounds and are obtained according to the process described in U.S. Pat. No. 3,217,014 by reaction of aminocarboxylic acids with the carboxylic acid anhydrides of at least tribasic aromatic carboxylic acids. Advantageously 1 mole of aminocarboxylic acid is used for monocarboxylic acid anhydrides, and with advantage 2 moles of aminocarboxylic acid for carboxylic acid dianhydrides.

Particularly suitable carboxylic acids that are at least tribasic are:
trimellitic acid
pyromellitic acid
prehnitic acid
1,2,4-naphthalenetricarboxylic acid
1,2,6-naphthalenetricarboxylic acid
1,5,8-naphthalenetricarboxylic acid
1,4,5,8-naphthalenetetracarboxylic acid
1,2,6,7-naphthalenetetracarboxylic acid
2,3,6,7-naphthalenetetracarboxylic acid
3,3'-4,4'-biphenyltetracarboxylic acid
2,3,5,6-biphenyltetracarboxylic acid
2,2',6,6'-biphenyltetracarboxylic acid
2,2'-3',3'-biphenyltetracarboxylic acid
3,3'-4,4'-diphenylethertetracarboxylic acid
3,3'-4,4'-diphenylsulphonetetracarboxylic acid.

Suitable amino acids are the same acids as are used for the manufacture of the amidocarboxylic acids.

Particularly suitable aminocarboxylic acids are:
aminoacetic acid
aminopropionic acid
m- and p-aminobenzoic acid
m- and p-aminomethylbenzoic acid
m- and p-aminophenylacetic acid
m- and p-aminomethylphenylacetic acid
m- and p-aminophenylpropionic acid.

Depending on which of the cited tricarboxylic or tetracarboxylic acids are used, there are obtained dicarboxylic acids in which the ring that contains an imido group and is condensed to the aromatic radical has either 5, 6 or 7 members.

Dicarboxylic acids that contain more than two carbocyclic rings with 4 to 6 members are described e.g. in U.S. Pat. No. 3,547,888. As particularly suitable compounds there may be cited:
1,4-naphthalenedicarboxylic acid
2,6-naphthalenedicarboxylic acid
2,7-naphthalenedicarboxylic acid
1,3,3-trimethyl-5-carboxy-3-(p-carboxyphenyl)-indane and as dicarboxylic acids of the formula V

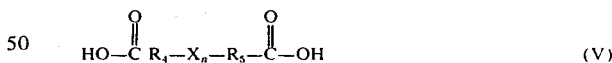

there may be cited:
4,4'-dicyclohexanedicarboxylic acid
3,3'-dicyclobutanedicarboxylic acid
3,3'-dicyclopentanedicarboxylic acid
p,p'-m,-'-and m,m'-diphenyldicarboxylic acid bis-p-(carboxyphenyl)-methane 2,2-bis-p-(carboxyphenyl)-ethane
2,2-bis-p-(carboxyphenyl)-propane
p,p'-,m,p'- and m,m'-diphenylsulphonedicarboxylic acid 4,4'-diphenyletherdicarboxylic acid.

The meta- and para-compounds are preferred in all carbocyclic starting components cited hereinbefore.

The diols of the formula VI that contain N,N-heterocyclic rings

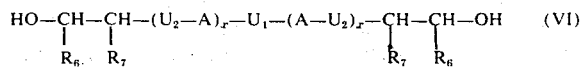

are, for x = O, known compounds and can be easily manufactured according to the process described in DOS 2,003,016 by addition of 2 moles of alkylene oxide, e.g. ethylene oxide, propylene oxide, butylene oxide, cyclohexane oxide or styrene oxide, to e.g. 1 mole of 1,1-methylene-bis-[5,5-dialkylhydantoin] or 1 mole of benzimidazolone or benzhydrogenated derivatives thereof in the presence of catalysts.

Examples of suitable 1,1-methylene-bis-[5,5-dialkyl-hydantoin]-diols are:

1,1-methylene-bis-[3-(2'-hydroxyethyl)-5,5-dimethylhydantoin]
1,1-methylene-bis-[3-(2'-hydroxy-n-propyl)-5,5-dimethylhydantoin]
1,1-methylene-bis-[3-(2'-hydroxy-n-butyl)-5,5-dimethylhydantoin] and
1,1-methylene-bis-[3-(2'-hydroxycyclohexyl)-5,5-dimethylhydantoin]
1,1-methylene-bis-[3-(2'-hydroxyethyl)-5-methylhydantoin]
1,1-methylene-bis-[3-(2'-hydroxy-n-propyl)-5-methyl5-ethylhydantoin]
1,1-methylene-bis-[3-(2'-hydroxyethyl)-5,5-diethylhydantoin]
1,1-methylene-bis-[3-(2'-hydroxyethyl)-5-butylhydantoin]

Examples of suitable N,N-bis-(hydroxyalkyl)-benzimidazolones are:

1,3-bis-(2'-hydroxyethyl)-benzimidazolone
1,3-bis-(2'-hydroxy-n-propyl)-benzimidazolone
1,3-bis-(2'-hydroxy-2'-phenylethyl)-benzimidazolone
1,3-bis-(2'-hydroxyethyl)-tetrahydrobenzimidazolone
1,3-bis-(2'-hydroxy-n-propyl)-tetrahydrobenzimidazolone
1,3-bis-(2'-hydroxy-2'-phenylethyl)-tetrahydrobenzimidazolone
1,3-bis-(2'-hydroxyethyl)-hexahydrobenzimidazolone.

The 1,3-bis-hydroxyalkylated benzimidazolones that are chlorinated and/or brominated at the phenyl nucleus are novel compounds and can be easily manufactured by halogenation of the hydroxyalkylated benzimidazolones with a surplus of bromine or chlorine. Preferably a stepwise reaction is carried out for manufacturing compounds containing chlorine and bromine.

As representatives there may be cited:

1,3-bis-(hydroxyethyl)-4,5,6,7-tetrabromo-benzimidazolone
1,3-bis-(hydroxyethyl)-4,5,6,7-tetrachloro-benzimidazolone.

Diols of the formula VI in which x = 1 are also novel compounds and can be manufactured according to the following reaction scheme:

1 mole of the known compound of the formula VII

$$H - U_1 - H \qquad (VII)$$

is condensed with 2 moles of the known monohalogeno compound of the formula VIII

$$H - U_2 - A - Hal \qquad (VIII)$$

wherein "Hal" represents a halogen atom, at temperatures between 20°C and 200°C in a suitable solvent, e.g. water or dioxan, and in the presence of a base, e.g. NaOH or pyridine, with 2 moles of hydrogen halide being split off. In modification of the process, 1 mole of a dihalogeno compound of the formula IX

$$Hal - A - U_1 - A - Hal \qquad (IX)$$

is reacted with 2 moles of a compound of the formula X

$$H - U_2 - H \qquad (X)$$

with 2 moles of hydrogen halide being split off.

One mole of the new compounds of the general formula XI

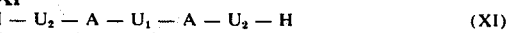
$$H - U_2 - A - U_1 - A - U_2 - H \qquad (XI)$$

manufactured by this process is reacted to give the diols of the formula VI by addition of 2 moles of an alkylene oxide of the formula XII

in the presence of an acid or a basic catalyst, e.g. AlCl₃ or triethylamine, and at temperatures between 0° and 200°C. In the above reaction scheme, the symbols $U_1$, $U_2$, A, $R_6$ and $R_7$ have the same meanings as in respect of the formula I.

Compounds that correspond to the formula XII are, besides ethylene oxide, also propylene oxide, butylene oxide, styrene oxide and cyclohexene oxide.

Examples of diols of the formula VI to be used according to the invention are:

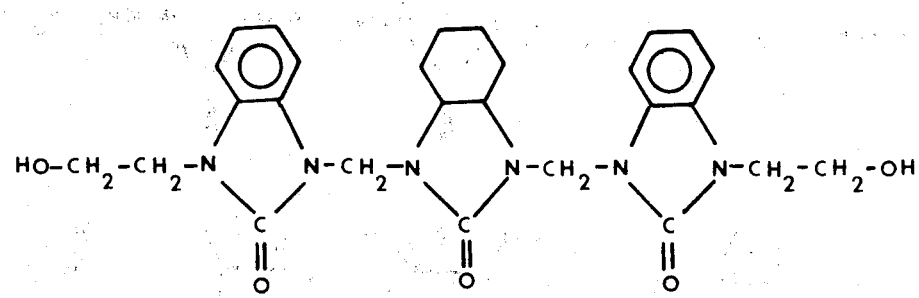

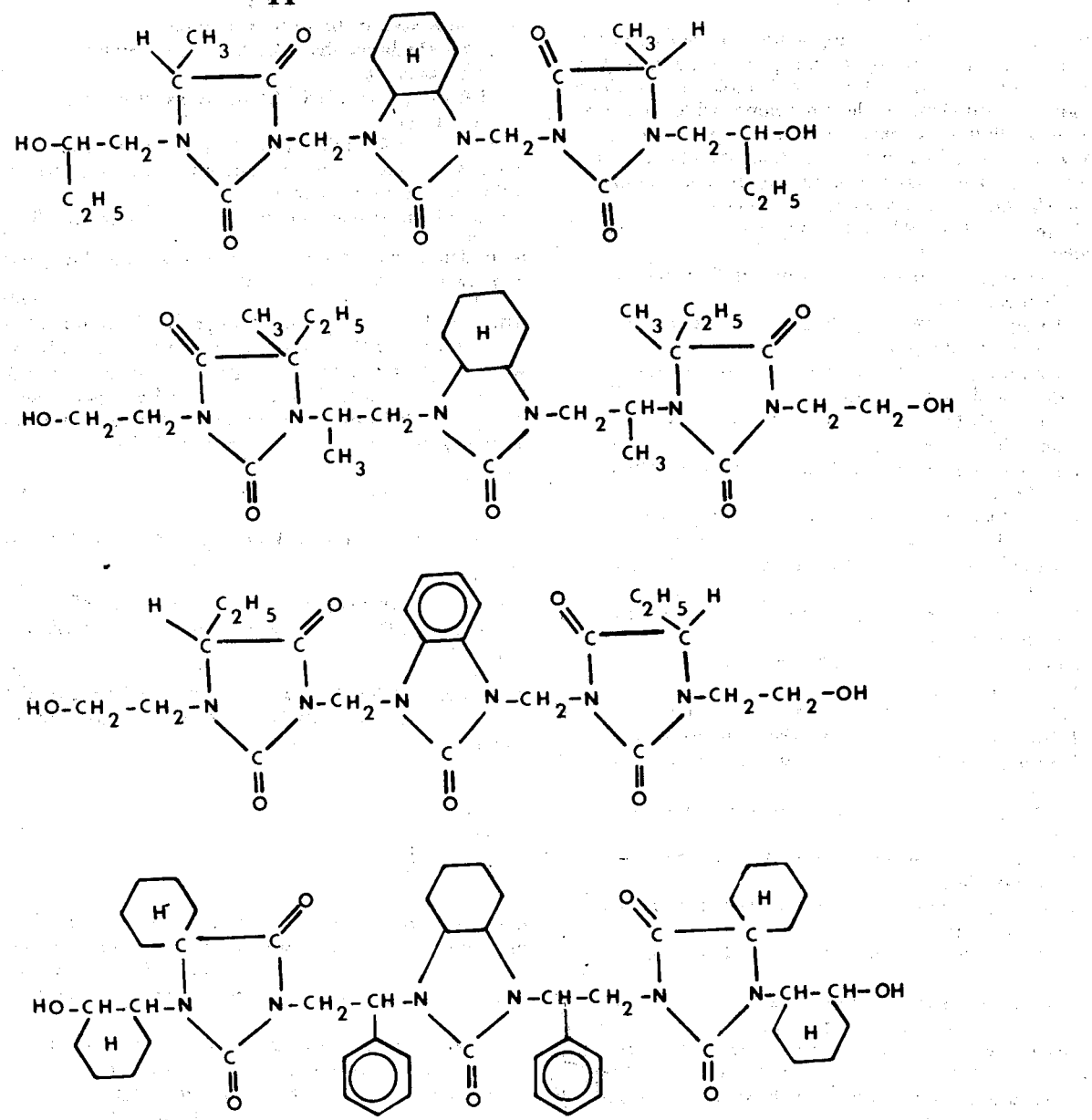
Examples of preferred diols of the formula VI are:
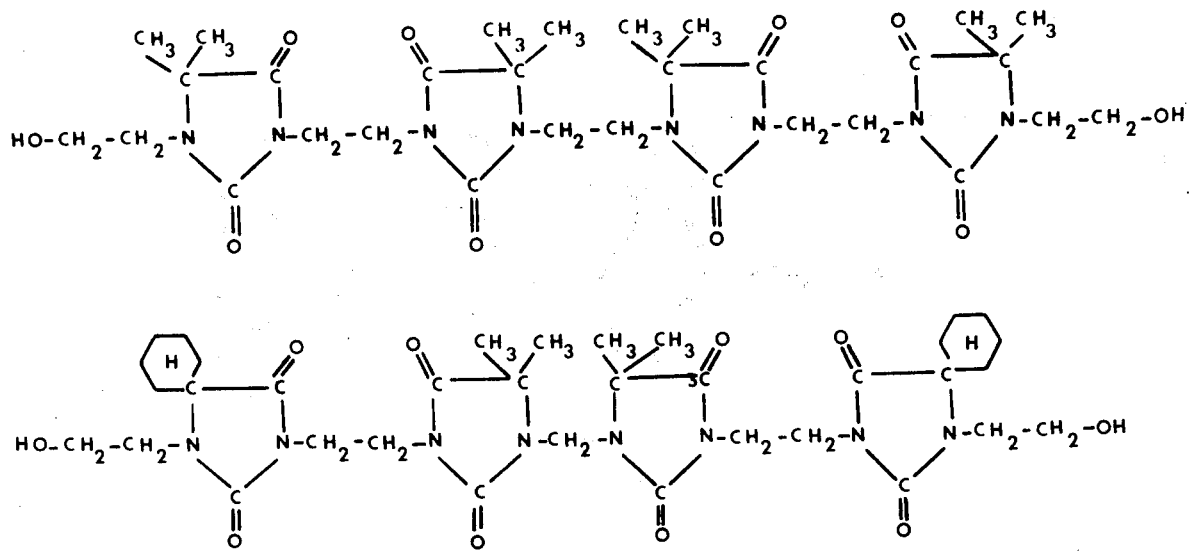

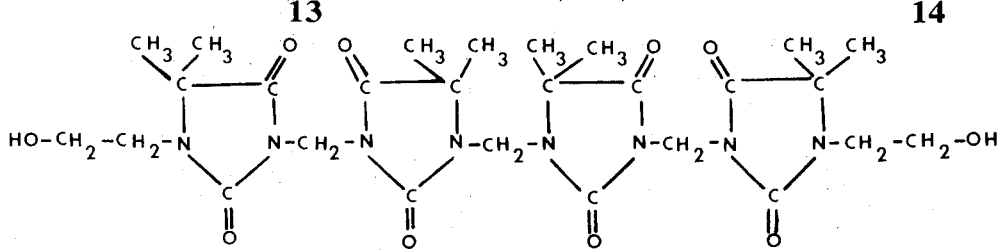

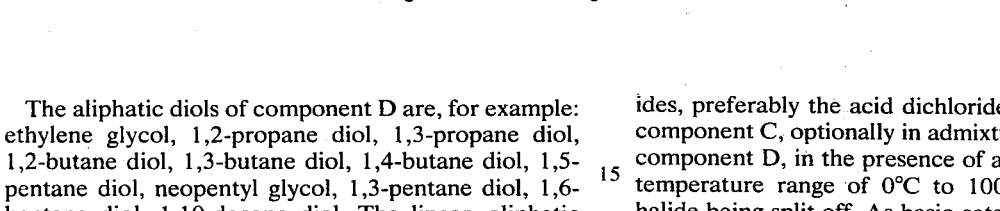

The aliphatic diols of component D are, for example: ethylene glycol, 1,2-propane diol, 1,3-propane diol, 1,2-butane diol, 1,3-butane diol, 1,4-butane diol, 1,5-pentane diol, neopentyl glycol, 1,3-pentane diol, 1,6-heptane diol, 1,10-decane diol. The linear, aliphatic diols especially those with 1 to 4 carbon atoms, and 1,4-hydroxymethylcyclohexane are preferred.

The new polyesters can be manufactured by esterifying or transesterifying the dicarboxylic acids to be used according to the invention or low molecular dialkyl esters or diaryl esters thereof and diols of components A and D in an inert atmosphere, e.g. a nitrogen atmosphere, in the presence of catalysts and while simultaneously removing the water or alkanol that forms, at 150°C to 250°C, and subsequently carrying out the polycondensation at 200°C to 270°C under reduced pressure and in the presence of specific catalysts, until the polycondensates exhibit the desired viscosity. In a preferred embodiment of this process, the diphenyl esters of the dicarboxylic acids are reacted with the diols in the ratio 1:1.

In the manufacture of polyesters that also contain aliphatic diols of the component D in addition to a diol to be used according to the invention, a surplus of this diol component is advantageously used, so that after the esterification or transesterification reaction principally monomeric diglycol esters of the diols are present, which are then polycondensed in the presence of a polycondensation catalyst while excess aliphatic diol is distilled off in vacuo.

As esterification catalysts, it is possible to use in known manner amines, inorganic or organic acids, e.g. hydrochloric acid or p-toluenesulphonic acid, or also metals or metal compounds that are also suitable as transesterification catalysts.

Since some catalysts tend to hasten the transesterification and others the polycondensation, it is desirable to use a combination of several catalysts. Examples of suitable transesterification catalysts are the oxides, salts or organic compounds of the metals calcium, magnesium, zinc, cadmium, manganese, titanium and cobalt. It is also possible to use the metals themselves as catalysts. The polycondensation is catalysed, for example, by metals like lead, titanium, germanium and especially antimony or compounds thereof. These catalysts can be added to the reaction mixture together or separately. The amounts in which these catalysts are used are from about 0.001 to 1.0 percent by weight, based on the acid component.

In the manufacture of the new polyesters it is advantageous to use those catalysts that hasten both the transesterification and the polycondensation. Suitable catalysts of this kind are chiefly mixtures of different metals or metal compounds and corresponding metal alloys.

Another process for manufacturing the new polyesters consists in polycondensing dicarboxylic acid dihalides, preferably the acid dichlorides, with the diols of component C, optionally in admixture with the diols of component D, in the presence of a basic catalysts in a temperature range of 0°C to 100°C, with hydrogen halide being split off. As basic catalysts there are used preferably tertiary amines or quaternary ammonium salts. The amount of basic catalyst can be from 0.1 to 100 molar %, based on the acid halides. This process can be carried out without a solvent or also in the presence of a solvent.

It is also possible to carry out the polycondensation in such a way that the starting compounds are first condensed in the melt up to a certain viscosity, the resultant precondensate is then granulated, e.g. using an underwater granulator, the granulate is dried and then subjected to a solid phase condensation in which vacuum and temperatures are applied below the melting point of the granulate. Higher viscosities of the polyesters can thereby be achieved.

The polycondensation reaction is carried out until the polyesters have a relative viscosity of 1.1 to 4.0, preferably 1.3 to 3.5. Depending on the nature of the catalyst used and the size of the batch, the reaction times are from about 30 minutes to several hours. The resultant polyester melt is granulated or shreded in the customary manner after it has been removed from the reaction vessel and cooled.

During the processing of the polyester melt or even before the polycondensation reaction, it is possible to add to the reaction mass inert additives of all kinds, e.g. fillers, reinforcing substances, in particular glass fibres, inorganic or organic pigments, fluorescent brighteners, matting agents, agents for promoting crystallisation and fire-proofing and flame retardant additives, for example antimony trioxide, or organic compounds that have a high content of chlorine and bromine, and in particular antimony trioxide if the polyesters according to the invention contain completely chlorinated and/or brominated 1,3-bis(hydroxyalkyl)-benzimidazolones as condensation component.

If the polycondensation reaction is carried out batchwise, these known measures can be taken during the final condensation steps, e.g. before the solid phase condensation or also at the conclusion of the melt condensation.

The polyesters according to the invention can be of low partial crystallinity to amorphous, depending on which diols and which dicarboxylic acids are used as starting components and in what quantitative ratios they are used. They are colourless to slightly yellow in colour and constitute thermoplastic materials from which mouldings with useful thermomechanical properties, especially high dimensional stability under heat, can be manufactured by the conventional moulding methods, e.g. casting, injection moulding and extruding.

The new polyesters are especially suitable as engineering plastic materials for the manufacture of moulded articles, e.g. gear wheels, containers for chemicals or foodstuffs, machine parts and apparatus parts, films, sheetings, boards, and also for the manufacture of semi-finished goods that can be machined. In addition, they are also suitable for coating objects, e.g. by the known powder coating methods.

The polyesters manufactured in the following Examples are characterised in more detail by the following data.

The polyesters are characterised by those morphological changes that are measured by means of differential thermoanalysis of a sample that is tempered for 3 minutes ar 30°C above the melting or softening point and then rapidly chilled. The chilled sample is heated by means of a Perkin-Elmer "DSC-1B" differential scanning calorimeter with a heating speed of 16°C/min. The thermogram of the sample (cf. graph in illustration 1) shows the glass transition temperature ($T_g$), the crystallisation temperature ($T_k$) and the melt temperature ($T_s$) respectively the softening temperature ($T_e$). The critical moment in the sudden increase of the specific heat in the thermogram indicates the glass transition temperature, the tip of the exothermic peak indicates the crystallisation temperature and the tip of the endothermic peak indicates the melt temperature respectively softening temperature. The relative viscosity of the polycondensates of the Examples is determined in solutions of 1 g of polyester in 100 ml of a mixture consisting of equal parts of phenol and tetrachloroethane at 30°C. The softening temperature is determined in a Kofler heating table microscope with a heating speed of 15°C/min., the procedure being that a cross is formed from 2 threads and the softening temperature is indicated as that temperature at which the sharp angles of the cross disappear.

EXAMPLES 1–17

The starting materials listed in Table 1 (if ethylene glycol, propane diol-1,3 or butane diol-1,4 is used concurrently, a 100 molar % surplus thereof, based on the sum of the diols contained in the polyester, is used) and 0.02% of titanium tetraisopropylate (based on the sum of the acid components) are put into a 2 litre reactor equipped with stirrer, nitrogen inlet, cooler and thermometer, and the mixture is heated to 200°C. With stirring and introducing nitrogen, 98% of the theoretical amount of methanol is distilled off and the temperature of the reaction mixture rises to 250°. Using a water jet pump, a vacuum of 50 Torr is applied within half an hour and the reaction temperature is simultaneously raised to 270°C. At constant reaction temperature, the vacuum is raised within half an hour to 0.7 Torr with a vacuum pump and kept thereat for a further 3 hours. Before it is opened, the reactor is ventilated with nitrogen. Polyesters with the characteristic data reported in Example 1 are obtained:

Table 1

| Ex. No. | Composition (molar ratio) | rel | $T_g$(°C) | $T_e$(°C) |
|---|---|---|---|---|
| | N,N-bis-(4-carbomethoxybenzene)-isophoron diamine/DMT// 1,1-methylene-bis-[3-(2'-hydroxyethyl)-5,5-dimethylhydantoin]/ethylene glycol | | | |
| 1 | 30/70//80/20 | 1.40 | 148 | 199 |
| 2 | 50/50//100/0 | 1.40 | 156 | 207 |
| 3 | 100/0//100/0 | 1.42 | 189 | 245 |

Table 1-continued

| Ex. No. | Composition (molar ratio) | rel | $T_g$(°C) | $T_e$(°C) |
|---|---|---|---|---|
| | p-(4-carboxybenzoyl)amino-benzoic acid/DMT// 1,1-methylene-bis-[3-(2'-hydroxyethyl)-5,5-dimethyl hydantoin]/ethylene glycol | | | |
| 4 | 20/80//50/50 | 1.38 | 116 | 170 |
| | N-trimellitic acid imide-p-benzoic acid ethyl ester/DMT// 1,1-methylene-bis-[3-(2'-hydroxyethyl)-5,5-dimethyl hydantoin]/ethylene glycol | | | |
| 5 | 30/70//50/50 | 1.76 | 129 | 190 |
| 6 | 50/50//50/50 | 1.50 | 139 | 170 |
| 7 | 90/10//50/50 | 1.56 | 152 | 165 |
| 8 | 100/0//50/50 | 1.68 | 155 | 195 |
| | N-trimellitic acid imide-p-benzoic acid ethyl ester/DMT// 1,1-methylene-bis-[3-(2'-hydroxyethyl)-5,5-dimethyl hydantoin]/butane diol-1,4 | | | |
| 9 | 50/50//50/50 | 1.50 | 123 | 155 |
| 10 | 100/0//50/50 | 1.48 | 135 | 180 |
| | N-trimellitic acid imide-p-benzoic acid ethyl ester/DSI// 1,1-methylene-bis-[3-(2'-hydroxyethyl)-5,5-dimethyl hydantoin]/ethylene glycol | | | |
| 11 | 50/50//50/50 | 1.94 | 138 | 190 |
| | N,N-pyromellitic acid imide-diacetic acid dimethyl ester/DMT// 1,1-methylene-bis-[3-(2'-hydroxyethyl)-5,5-dimethyl hydantoin]/ethylene glycol | | | |
| 12 | 30/70//50/50 | 2.06 | 133 | 190 |
| 13 | 50/50//100/0 | 1.57 | 157 | 240 |
| 14 | 100/0//100/0 | 1.50 | 172 | 236 |
| | N,N-pyromellitic acid imide-diacetic acid dimethyl ester/DMT// 1,1-methylene-bis-[3-(2'-hydroxyethyl)-5,5-dimethyl hydantoin]/butane diol-1,4 | | | |
| 15 | 50/50//50/50 | 1.54 | 116 | 160 |
| | N,N-pyromellitic acid imide-diacetic acid dimethyl ester/DMT// 1,3-di-(2-hydroxyethyl)benzimidazolone/ethylene glycol | | | |
| 16 | 30/70//50/50 | 1.41 | 152 | 180 |
| | N,N-pyromellitic acid imide-diacetic acid dimethyl ester/DMT// 1,3-di-(2-hydroxyethyl)-tetrachloro-benzimidazolone/ethylene glycol | | | |
| 17 | 30/70//30/70 | 1.78 | 146 | 205 |

EXAMPLES 18 – 30

The starting materials listed in Table 2 (if ethylene glycol, propane diol-1,3 or butane diol-1,4 is concurrently used, a 100 molar % surplus thereof, based on the sum of the diols contained in the polyester, is used) and 0.02% of titanium tetraisopropylate (based on the sum of the acid components) are put into a 2 litre capacity reactor equipped with stirrer, nitrogen inlet, cooler and thermometer and the mixture is heated to 200°C. With stirring and introducing nitrogen, 98% of the theoretical amount of methanol is distilled off and the temperature of the reaction mixture rises from 230°C to 250°C.

Using a water jet pump, a vacuum of 50 Torr is applied within half an hour and the reaction temperature is simultaneously raised to 260°C. At constant reaction temperature, the vacuum is raised to 0.7 Torr within half an hour with a vacuum pump and kept thereat for a further 3 hours. Before it is opened, the reactor is ventilated with nitrogen. Polyesters with the characteristic data reported in Table 2 are obtained:

Table 2

| Ex. No. | Composition (molar ratio) | rel | $T_g$(°C) | $T_e$(°C) |
|---|---|---|---|---|
| | 4,4'-diphenylsulphone-dicarboxylic acid dimethyl ester/DMT// 1,1-methylene-bis-[3-(2'-hydroxyethyl)-5,5-dimethyl hydantoin]/ethylene glycol | | | |
| 18 | 10/90//80/20 | 1.47 | 126 | 188 |
| 19 | 30/70//80/20 | 1.43 | 132 | 188 |
| 20 | 50/50//80/20 | 1.35 | 139 | 178 |
| 21 | 80/20//80/20 | 1.41 | 150 | 198 |
| 22 | 50/50//100/0 | 1.38 | 144 | 195 |
| 23 | 100/0//100/0 | 1.29 | 153 | 196 |
| | 2,6-naphthalenedicarboxylic acid dimethyl ester/DMT// | | | |

Table 2-continued

| Ex. No. | Composition (molar ratio) | rel | $T_g$(°C) | $T_r$(°C) |
|---|---|---|---|---|
| | 1,1-methylene-bis-[3-(2'-hydroxyethyl)-5,5-dimethyl hydantoin]/ethylene glycol | | | |
| 24 | 30/70//80/20 | 1.48 | 130 | 185 |
| 25 | 50/50//100/0 | 1.43 | 141 | 200 |
| 26 | 100/0//100/0 | 1.41 | 148 | 217 |
| | 1,1,3-trimethyl-5-carboxy-3-(p-carboxyphenyl)-indane/DMT// 1,1-methylene-bis-[3-(2'-hydroxyethyl)-5,5-dimethyl hydantoin]/ethylene glycol | | | |
| 27 | 30/70//80/20 | 1.33 | 133 | 182 |
| | 4,4'-diphenylsulphone-dicarboxylic acid dimethyl ester/DMT// 1,3-di-(2-hydroxyethyl)benzimidazolone/ethylene glycol | | | |
| 28 | 30/70//50/50 | 1.55 | 122 | 160 |
| | 4,4'-diphenylsulphone-dicarboxylic acid dimethyl ester/DMT// 1,3-di-(2-hydroxyethyl)-tetrachloro-benzimidazolone/ethylene glycol | | | |
| 29 | 30/70//30/70 | 1.30 | 144 | 183 |
| | 2,6-naphthalenedicarboxylic acid dimethyl ester/DMT// 1,3-di-(2-hydroxyethyl)-tetrabromobenzimidazolone/ethylene glycol | | | |
| 30 | 30/70//20/80 | 1.53 | 128 | 168 |

EXAMPLES 31 to 95

The starting substances under the heading "composition" in Table 3 were polycondensed according to the process described in Examples 18–30. The properties of the resultant polyesters are also reported in the Table.

Table 3

| Ex. No. | Composition (see abbreviations) | Molar Ratio | rel | $T_g$(°C) | $T_r$(°C) |
|---|---|---|---|---|---|
| 31 | DMT+CBAB+EG | 0.77:0.23:1 | 1.53 | 89 | 155 |
| 32 | DMT+CBAB+I+EG | 0.8:0.2:0.5:0.5 | 1.38 | 116 | 170 |
| 33 | DMT+DPSDM+II+EG | 0.7:0.3:0.3:0.7 | 1.30 | 144 | 185 |
| 34 | DMT+NDDM+III+EG | 0.7:0.3:0.2:0.8 | 1.53 | 128 | 170 |
| 35 | DMT+DPSDM+IV+EG | 0.7:0.3:0.2:0.8 | 1.55 | 122 | 160 |
| 36 | DMT+XIII+II+EG | 0.7:0.3:0.3:0.7 | 1.78 | 146 | 205 |
| 37 | DMT+XIII+IV+EG | 0.7:0.3:0.5:0.5 | 1.41 | 152 | 180 |
| 38 | DMT+V+II+EG | 0.7:0.3:0.3:0.7 | 1.49 | 147 | 190 |
| 39 | DMT+V+IV+EG | 0.7:0.3:0.5:0.5 | 1.53 | 136 | 160 |
| 40 | DMT+V+III+EG | 0.7:0.3:0.2:0.8 | 1.35 | 142 | 190 |
| 41 | DMI+DPSDM+II+EG | 0.7:0.3:0.3:0.7 | 1.50 | 126 | 195 |
| 42 | DMI+V+II+EG | 0.7:0.3:0.3:0.7 | 1.58 | 138 | 170 |
| 43 | DMT+DPSDM+I | 0.7:0.3:1.0 | 1.35 | 130 | 170 |
| 44 | DMI+V+II | 0.7:0.3:1.0 | 1.25 | 167 | 190 |
| 45 | DMT+DPSDM+I+EG | 0.9:0.1:0.1:0.9 | 1.79 | 96 | 140 |
| 46 | DMT+DPSDM+I+EG | 0.85:0.15:0.15:0.85 | 1.57 | 98 | 143 |
| 47 | DMT+DPSDM+I+CHDM | 0.9:0.1:0.1:0.1:0.8 | 1.67 | 98 | 147 |
| 48 | DMT+DMI+DPSDM+I+EG | 0.4:0.3:0.3:0.3:0.7 | 1.48 | 118 | 155 |
| 49 | DMT+II+NPG | 1.0:0.5:0.5 | 1.26 | 125 | 150 |
| 50 | DMT+DPSDM+VI+EG | 0.7:0.3:0.5:0.5 | 1.18 | 145 | 160 |
| 51 | DMT+NDDM+I+EG | 0.5:0.5:0.3:0.7 | 1.79 | 115 | 170 |
| 52 | DMT+DPSDM+VII+EG | 0.7:0.3:0.2:0.8 | 1.41 | 115 | 160 |
| 53 | DMT+V+VII+EG | 0.7:0.3:0.2:0.8 | 1.39 | 129 | 165 |
| 54 | DMT+DPSDM+II+EG | 0.8:0.2:0.3:0.7 | 1.57 | 131 | 180 |
| 55 | DMT+PIDA+II+EG | 0.8:0.2:0.3:0.7 | 1.51 | 129 | 170 |
| 56 | DMT+DPSDM+I+Dianol 22+EG | 0.7:0.3:0.3:0.3:0.4 | 1.65 | 114 | 160 |
| 57 | DMT+V+VII+EG | 0.7:0.3:0.2:0.8 | 1.50 | 131 | 170 |
| 58 | DPT+DPSDM+VII | 0.7:0.3:1 | 1.23 | 134 | 155 |
| 59 | VIII+I | 1:1 | 1.41 | 185 | 205 |
| 60 | IX+I | 1:1 | 1.34 | 169 | 180 |
| 61 | DPT+DPSDM+I | 0.1:0.9:1 | 1.58 | 158 | 190 |
| 62 | DPT+DPSDM+I | 0.3:0.7:1 | 1.52 | 154 | 180 |
| 63 | DPT+DPSDM+I | 0.8:0.2:1 | 1.44 | 140 | 180 |
| 64 | DPT+NDDM+II | 0.3:0.7:1 | 1.23 | 180 | 200 |
| 65 | DPT+XIII+I | 0.3:0.7:1 | 1.65 | 162 | 200 |
| 66 | DPT+XIII+I | 0.8:0.2:1 | 1.61 | 156 | 200 |
| 67 | DPT+XIII+I | 0.1:0.9:1 | 1.30 | 165 | 200 |
| 68 | NDDM+II+EG | 1:0.5:0.5 | 2.14 | 126 | 210 |
| 69 | DPSDM+II+EG | 1:0.5:0.5 | 1.46 | 165 | 200 |
| 70 | DPSDM+II+EG | 1:0.1:0.9 | 1.28 | 148 | 210 |
| 71 | DPSDM+II+EG | 1:0.3:0.7 | 1.27 | 159 | 195 |
| 72 | DPSDM+II+EG | 1:0.8:0.2 | 1.32 | 166 | 200 |
| 73 | DPSDM+II | 1:1 | 1.18 | 180 | 205 |
| 74 | XIII+II+EG | 1:0.1:0.9 | — | 161 | 200 |
| 75 | XIII+II+EG | 1:0.8:0.2 | 1.22 | 177 | 195 |
| 76 | DMT+DPSDM+I+EG | 0.9:0.1:0.08:0.92 | 1.80 | 92 | 155 |
| 77 | DMT+NDDM+II+EG | 0.9:0.1:0.08:0.92 | 1.81 | 95 | 160 |
| 78 | XIII+I+P | 1:0.3:0.7 | 1.42 | 164 | 190 |
| 79 | NDDM+II | 1:1 | 1.21 | 191 | 205 |
| 80 | DPT+V+II | 0.8:0.2:1 | 1.25 | 169 | 200 |
| 81 | DPSDM+III | 1:1 | 1.16 | 190 | 210 |
| 82 | DMT+MCMCB+I+EG | 0.7:0.3:0.3:0.7 | 1.30 | 133 | 175 |
| 83 | TMIB+I | 1:1 | 1.32 | 163 | 180 |
| 84 | DPSDM+I+NPG | 1.0:0.3:0.7 | 1.34 | 143 | 165 |
| 85 | DPSDM+I+Dianol 22 | 1.0:0.3:0.7 | 1.48 | 129 | 165 |
| 86 | DMT+V+II+CHDM+EG | 0.7:0.3:0.3:0.3:0.4 | 1.65 | 154 | 180 |

Table 3-continued

| Ex. No. | Composition (see abbreviations) | Molar Ratio | rel | $T_g(°C)$ | $T_r(°C)$ |
|---|---|---|---|---|---|
| 87 | DMT+DPSDM+II+EG | 0.5:0.5:0.2:0.8 | 1.55 | 142 | 180 |
| 88 | X+I | 1:1 | 1.25 | 140 | 170 |
| 89 | XI+I | 1:1 | 1.50 | 103 | 145 |
| 90 | DMT+V+XII+EG | 0.9:0.1:0.1:0.9 | 1.52 | 99 | 160 |
| 91 | DMT+V+II+EG | 0.9:0.1:0.08:0.92 | 1.53 | 102 | 165 |
| 92 | V+I+EG | 1:0.5:0.5 | 1.23 | 172 | 190 |
| 93 | DMT+DMI+V+H | 0.4:0.3:0.3:1.0 | 1.28 | 140 | 160 |
| 94 | DMT+XIV+I+EG | 0.9:0.1:0.2:0.8 | insoluble | 111 | 200 |
| 95 | DMT+XV+I+EG | 0.9:0.1:0.2:0.8 | insoluble | 102 | 190 |

Abbreviations (also for other Tables)
EG : ethylene glycol
DMT : dimethyl terephthalate
DMI : dimethyl isophthalate
CBAB : p(4-carboxybenzoyl)aminobenzoic acid
NDDM : 2,6-naphthalenedicarboxylic acid dimethyl ester
I : 1,1-methylene-bis-[3-(2'-hydroxyethyl)-5,5-dimethyl hydantoin]
II : 1,3-dihydroxyethyl-4,5,6,7-tetrachlorobenzimidazolone
III : 1,3-dihydroxyethyl-4,5,6,7-tetrabromobenzimidazolone
XIII : N,N-pyromellitic acid imide-diacetic acid dimethyl ester
IV : 1,3-dihydroxyethyl-benzimidazolone
DPSDM : 4,4'-diphenylsulphonedicarboxylic acid dimethyl ester
V : N,N-bis-(4-carbomethoxybenzoyl)-isophoron diamine
CHDM : cyclohexanedimethanol-1,4
NPG : neopentyl glycol
VII : 1,1-methylene-bis-[3-(2'-hydroxypropyl)-5,5-dimethyl hydantoin]
PIDA : phenylindanedicarboxylic acid
Dianol 22 : (1,1-isopropylidene-bis-[(p-phenyloxy)diethanol-2]
VIII : N,N-bis-(4-carbomethoxybenzoyl)-metaphenylene diamine
DPT : diphenyl terephthalate
IX : 1,4-bis-(4-carbomethoxybenzoyl)-p-phenylene diamine
P : propane diol-1,2
MCMCB : methyl-4-(4-carbomethoxycyclohexyl)benzoate
TMIB : trimellitimidobenzoic acid ethyl ester
VI :

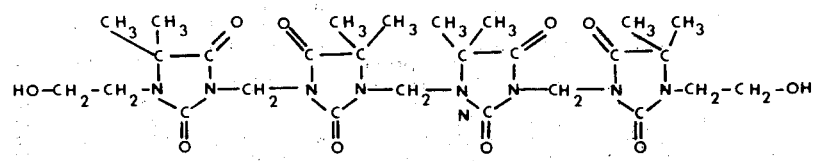

X : 1,2-bis-(4-carbomethoxybenzoyl)ethylene diamine
XI : 1,12-bis-(4-carbomethoxybenzoyl)dodecamethylene diamine
XIV : N,N'-bis-(4-carbobutoxybenzoyl)-4,4'-diaminodiphenyl ether
XV : N,N'-bis-(4-carbobutoxybenzoyl)-1,4-bis-(4'-aminophenoxy)-benzene
XII :

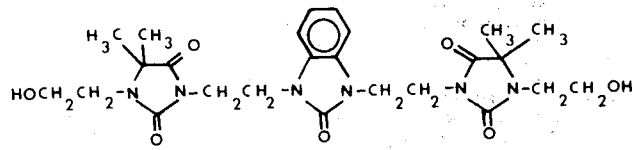

I claim:
1. A linear, thermoplastic polyester with a high glass transition temperature and a relative viscosity of 1.1 to 4.0 dl/g, measured at 30°C in a 1% solution of equal parts phenol and trichloroethane consisting essentially in the total condensed acid component of (A) 0 to 90 mol % of an acid selected from the group consisting of terephthalic acid and isophthalic acid or a mixture thereof; and of (B) 10 to 100 mol % of a dicarboxylic acid selected from the group consisting of an amidodicarboxylic acid of the formula

$$HOOC-(R_1-E)_x-R_2-E-R_3-COOH$$

wherein $x$ is 0 or 1, E is the —CONH— group the NH group of which is bonded to $R_2$ or $R_3$ or optionally to $R_1$ or $R_2$, and each of $R_1$, $R_2$ and $R_3$ independently is alkylene of 1 to 12 carbon atoms, an aromatic radical phenylene, diphenylene, naphthylene, 4,4'-sulphonediphenyl or

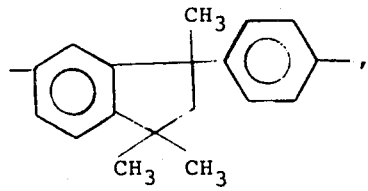

a cycloaliphatic radical

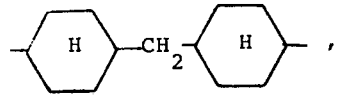

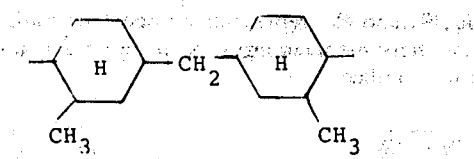

or

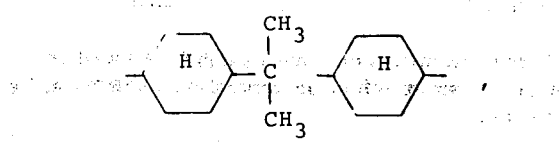

an aromatic-aliphatic radical

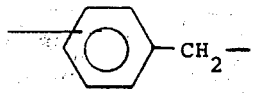

or

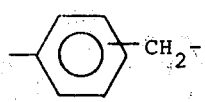

wherein the methylene groups can be bonded in the meta or para- position or a cycloaliphatic-aliphatic radical

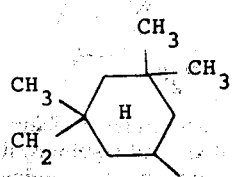

with the proviso that, if $x$ is 1, $R_2$ cannot be the methylene group when the NH groups of the —CONH groups are bonded to $R_2$ and that one of $R_1$, $R_2$ and $R_3$ is an aromatic radical; an imidodicarboxylic acid of the structure N-carboxyalkyl-, N-carboxyphenylalkyl-, N-carboxyalkylphenyl- or N-carboxyphenyltrimellitic acid imide or N,N'-carboxyalkyl-, N,N'-carboxyphenylalkyl-, N, N'-carboxyalkylphenyl-, or N, N'-carboxyphenylpyromellitic acid imide; a naphthalene dicarboxylic acid; a carboxyphenylindane carboxylic acid; and a dicarboxylic acid of the general formula

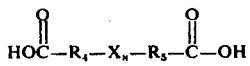

wherein $n$ is 0 or 1, X represents the sulphur or oxygen atom, or the sulphone, methylene, ethylidene or propylidene radical and each of $R_4$ and $R_5$ independently represents a carboxylic ring with 4 to 6 members; and in the total condensed diol component of (C) 5 to 100 mol % of a diol selected from the group consisting of a diol of the formula

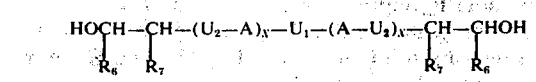

where X is 0 or 1, $R_6$ is hydrogen, methyl, ethyl or phenyl, $R_7$ is hydrogen or together with $R_6$ is tetramethylene, A represents a radical of the formula

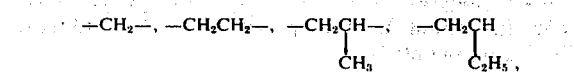

$U_1$ represents a radical of the formula

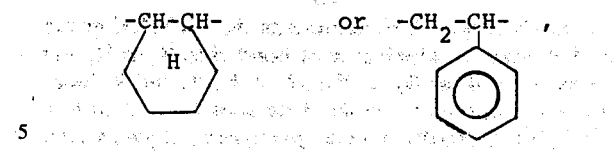

or

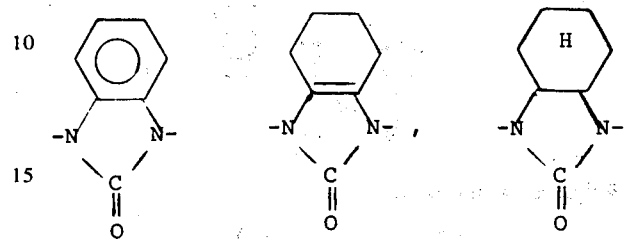

wherein each of $B_1$ and $B_2$ independently represents hydrogen or alkyl with 1 to 4 carbon atoms; or when X is 0, $U_1$ can be

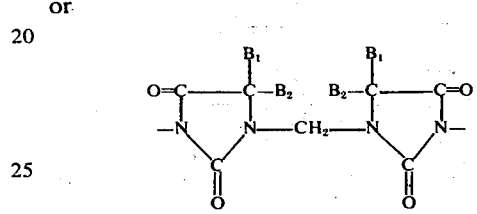

and $U_2$ has the same meaning as $U_1$ or represents the formula

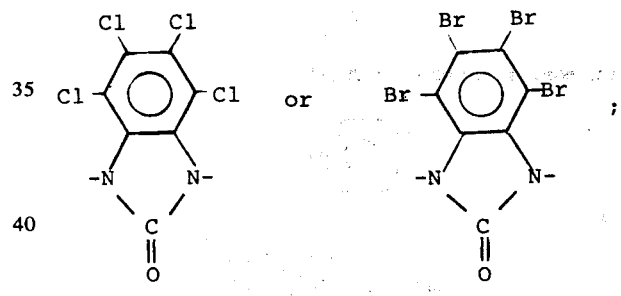

wherein each of $D_1$ and $D_2$ independently represents hydrogen, alkyl with 1 to 4 carbon atoms or phenyl or together $D_1$ and $D_2$ are pentamethylene; and of (D) 0 to 95 mol % of a diol selected from the group consisting of an aliphatic diol with 2 to 10 carbon atosm, 1,4-cyclohexanedimethanol and 1,4-cyclohexanediol or a mixture thereof.

2. A polyester according to claim 1 with a viscosity of 1.3 to 3.5.

3. A polyester according to claim 1, which contain amidodicarboxylic acid radicals of the general formula I

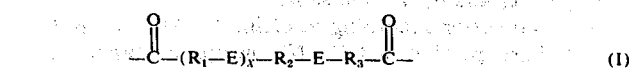 (I)

wherein X is 0 or 1, E represents the —CONH group the NH group of which can be bonded to $R_2$ or $R_3$ and optionally to $R_1$ or $R_2$, and each of $R_1$, $R_2$ and $R_3$ independently represents an alkylene with 1 to 12 carbon atoms, an aromatic radical phenylene, diphenylene, naphthylene, 4,4'-sulphonediphenyl or

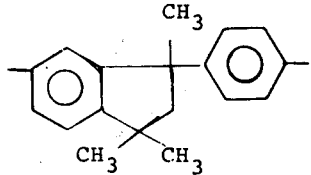

a cycloaliphatic radical

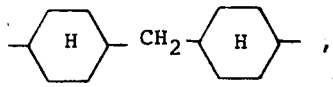

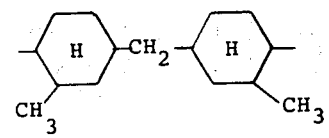

or

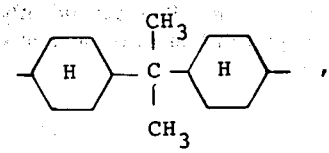

an aromatic-aliphatic radical

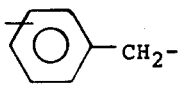

or

wherein the methylene groups can be bonded in the meta or para-position, or a cycloaliphatic-aliphatic radical

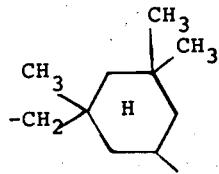

with the proviso that, if X is 1, $R_2$ cannot be the methylene group when the NH groups of the —CONH groups are bonded to $R_2$ and that one of $R_1$, $R_2$ and $R_3$ is an aromatic radical.

4. A polyester according to claim 3, wherein each of $R_1$, $R_2$ and $R_3$ independently represents a phenylene, a diphenylene, a naphthylene, a 4,4'-sulphonediphenyl or a phenylindane radical.

5. A polyester according to claim 3, wherein the radicals $R_1$ and $R_3$ are the same.

6. A polyester according to claim 3, wherein x is 1, the NH groups of the —CO—NH groups are bonded to $R_2$, $R_1$ and $R_3$ represents a phenylene radical and $R_2$ has the same meaning as $R_1$ or represents a radical of the formulae

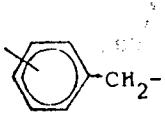 , 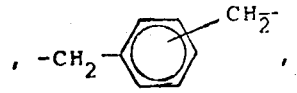 , wherein the methylene groups can be bonded in the meta- or para-position, or represents a radical of the formulae

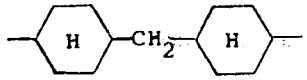

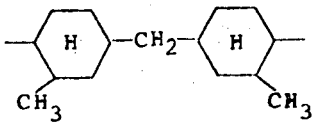

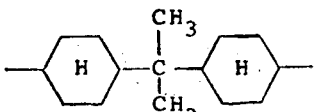

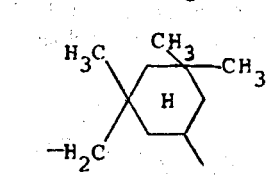

7. A polyester according to claim 1, which contain N-carboxyalkylated, carboxyphenylalkylated, carboxyalkylphenylalkylated or carboxyphenylated trimellitic or pyromellitic acid imide radicals as imidodicarboxylic acid radicals.

8. A polyester according to claim 7, wherein the alkylene group contains 1 or 2 carbon atoms.

9. A polyester according to claim 7, which contain radicals of N-carboxyphenyltrimellitic acid imide, N,N-bis-(carboxyphenyl)-promellitic acid imide, N,N-bis-(carboxymethyl)pyromellitic acid imide or N,N-bis-[(carboxyphenyl)methyl]pyromellitic acid imide.

10. A polyester according to claim 1, which contain naphthalenedicarboxylic acid radicals or radicals of the general formula II

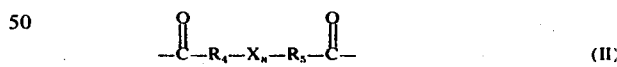 (II)

wherein n is 0 or 1, X represents a sulphur atom, an oxygen atom, the sulphone, methylene, ethylidene or propylidene radical, and each of $R_4$ and $R_5$ independently represents a carbocyclic ring with 4 to 6 members.

11. A polyester according to claim 10, wherein n is 0 and $R_4$ and $R_5$ represent a phenylene radical.

12. A polyester according to claim 10, wherein X represents the sulphone radical and $R_4$ and $R_5$ represent the phenylene radical.

13. A polyester according to claim 1, which contain naphtalenedicarboxylic acid radicals or carboxyphenylindanecarboxylic acid radicals.

14. A polyester according to claim 1, which contain 10 to 100 molar % of component C and 0 to 90 molar % of component D.

15. A polyester according to claim 1, which contains diol radicals of the formula III

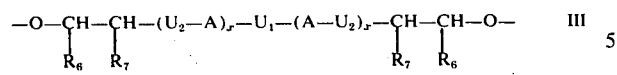

wherein $x$ is 0 or 1, $R_6$ represents a hydrogen atom, the methyl, ethyl or phenyl groups, and $R_7$ represents a hydrogen atom or together with $R_6$ represents the tetramethylene radical, A represents a radical of the formulae

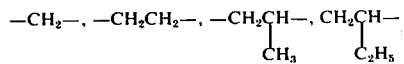

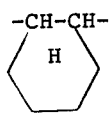

or

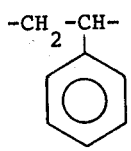

$U_1$ represents a radical of the formulae

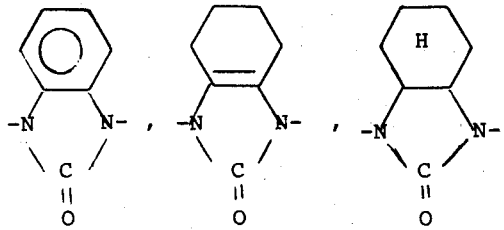

or

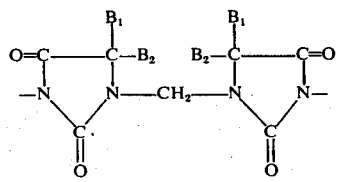

wherein each of $B_1$ and $B_2$ independently represents a hydrogen atom or an alkyl radical with 1 to 4 carbon atoms, or when $x$ is 0, $U_1$ can be

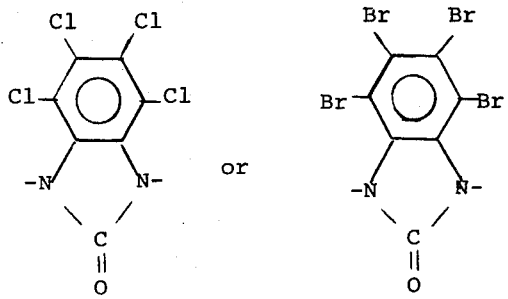

and $U_2$ has the same meaning as $U_1$ or represents a radical of the formula

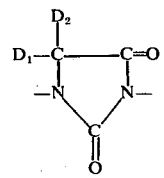

wherein each of $D_1$ and $D_2$ independently represents a hydrogen atom, an alkyl radical with 1 to 4 carbon atoms, the phenyl group, or together they represent the pentamentylene radical.

16. A polyester according to claim 15, wherein $R_6$ represents a hydrogen atom and A represents the methylene or ethylene group.

17. A polyester according to claim 15, wherein $B_1$ and $B_2$ represent a hydrogen atom, the methyl or ethyl group, and $D_1$ and $D_2$ represent a hydrogen atom, the methyl group, the ethyl group, or together they represent the pentamethylene radical.

18. A polyester according to claim 15, wherein $x$ is 0 and $U_1$ represents the benzimidazolone radical.

19. A polyester according to claim 15, wherein the phenyl nucleus of the benzimidazolone radical is completely brominated or chlorinated and $x$ is 0.

20. A polyester according to claim 1, which contain as component D radicals of an aliphatic diol with 1 to 6 carbon atoms.

21. A polyester according to claim 3, wherein in formula I each of $R_1$, $R_2$ and $R_3$ independently represents a linear alkylene radical with 1 to 12 carbon atoms.

22. A polyester according to claim 21, wherein the alkylene radical contains 1 to 2 carbon atoms.

23. A polyester according to claim 1, which contain 4,4'-diphenylsulphone acid radicals, 2,6-naphthalenedicarboxylic acid radicals or N,N-bis-(4-carbobenzoyl)-isophoron diamine radicals as component B.

24. A polyester according to claim 1, which contain 1,1-methylene-bis-[3-(2'-oxyethyl)-5,5-dimethyl hydantoin] radicals or 1,3-dioxyethyl-4,5,6,7-tetrachlorobenzimidazolone radicals as component C.

* * * * *